March 15, 1960 E. N. JONES 2,928,471
FLUID PRESSURE OPERATED BOTTOM HOLE CHEMICAL INJECTOR
Filed Aug. 17, 1956 4 Sheets-Sheet 1
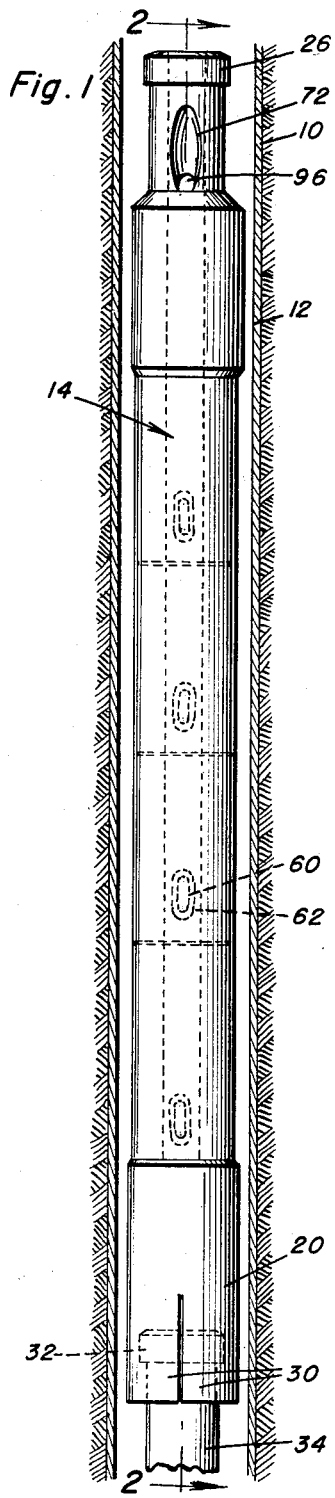
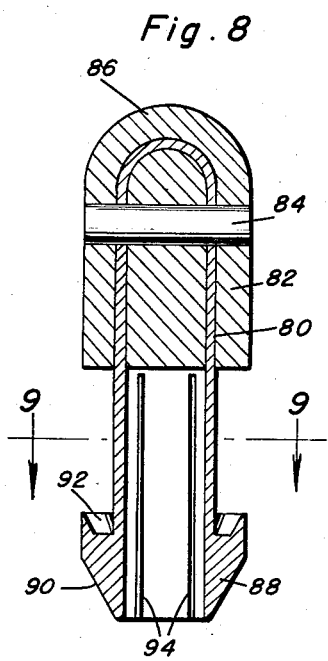
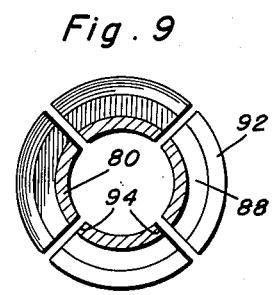
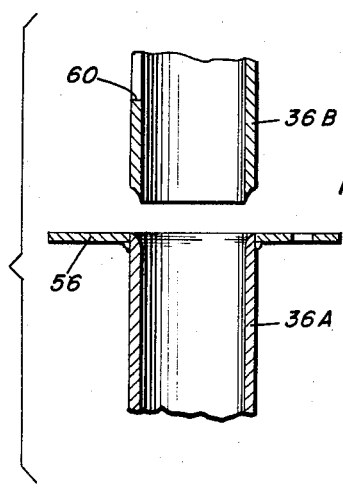
Edward N. Jones
INVENTOR.

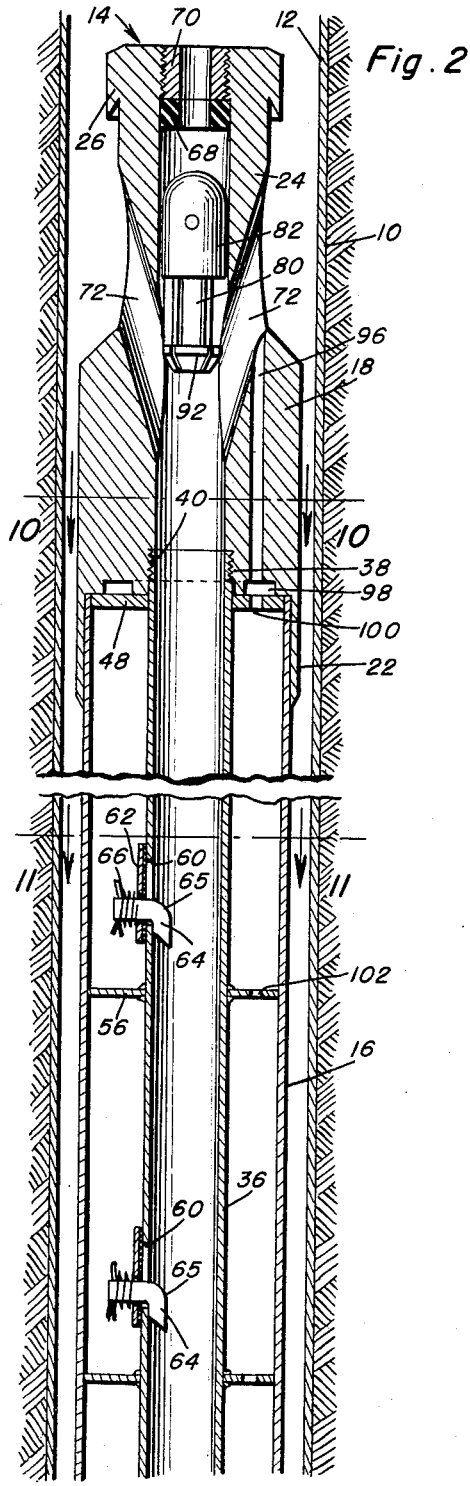
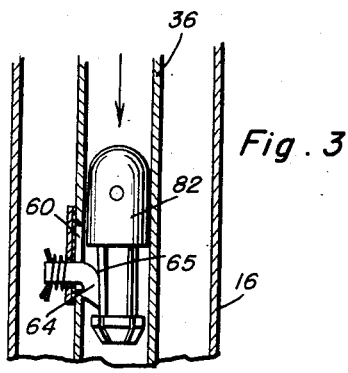
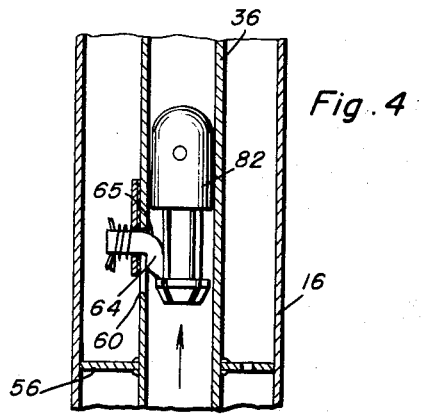
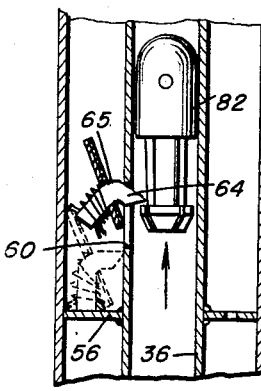
Edward N. Jones
INVENTOR.

March 15, 1960 E. N. JONES 2,928,471
FLUID PRESSURE OPERATED BOTTOM HOLE CHEMICAL INJECTOR
Filed Aug. 17, 1956 4 Sheets-Sheet 3
Fig. 2A
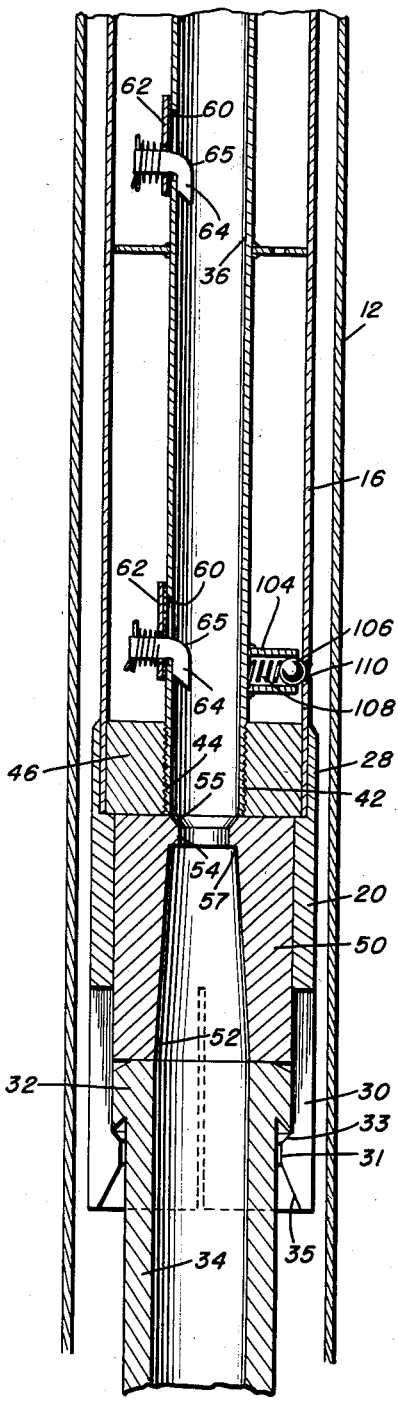
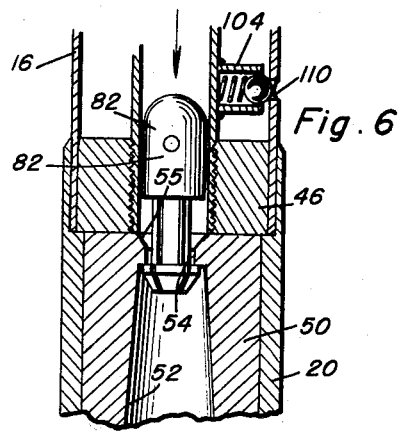
Fig. 6
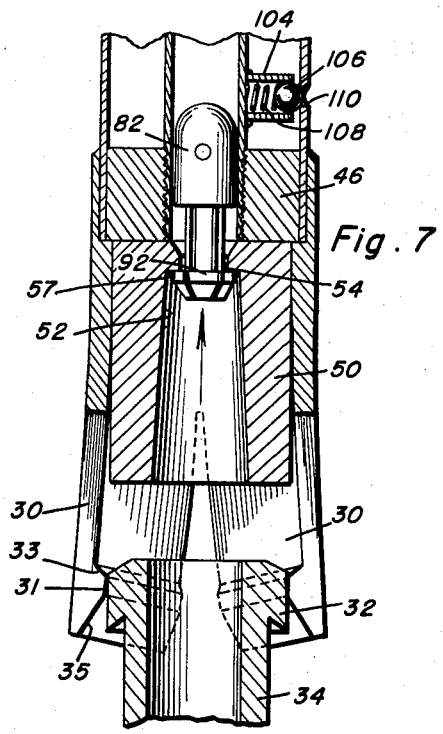
Fig. 7
Edward N. Jones
INVENTOR.
BY
Attorneys March 15, 1960 E. N. JONES 2,928,471
FLUID PRESSURE OPERATED BOTTOM HOLE CHEMICAL INJECTOR
Filed Aug. 17, 1956 4 Sheets-Sheet 4
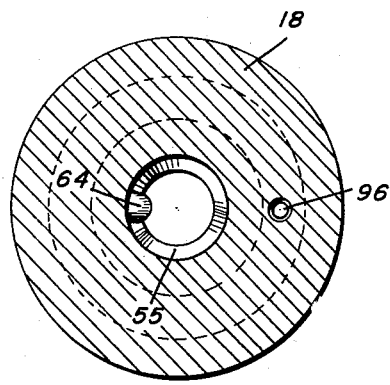
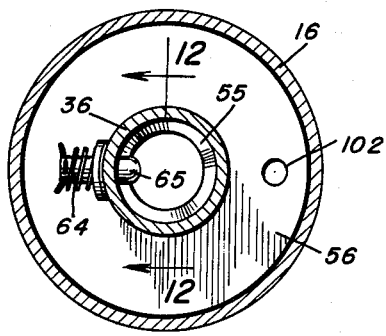
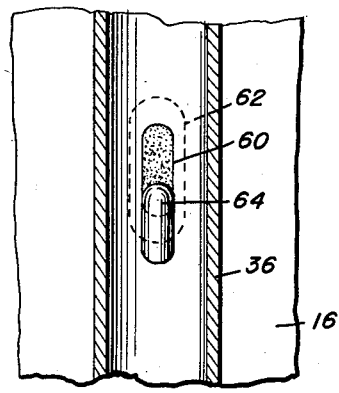
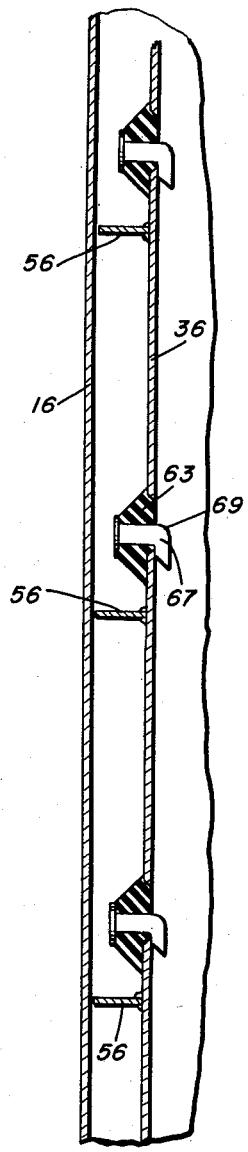
Edward N. Jones
INVENTOR.

United States Patent Office 2,928,471
Patented Mar. 15, 1960

2,928,471

FLUID PRESSURE OPERATED BOTTOM HOLE CHEMICAL INJECTOR

Edward N. Jones, Beeville, Tex.

Application August 17, 1956, Serial No. 604,823

10 Claims. (Cl. 166—162)

This invention comprises a novel and useful fluid pressure operated bottom hole chemical injector and method and more particularly relates to an apparatus and a process for facilitating the positive, controlled injection of chemicals at a selected location in a well bore.

The primary purpose of this invention is to provide an apparatus and a method which will facilitate the injection of chemical treating agents such as those to treat and remove corrosion or scale in tubings or casings of flowing wells, and to do so in a greatly simplified manner and with a much greater precision as to the time, quantity and location of the injection than has been heretofore possible.

A further object of the invention is to provide an apparatus and a method in accordance with the foregoing object wherein the chemical treating agent may be introduced into the hole in a highly concentrated form and may be released in said highly concentrated form at a predetermined time and location.

A further important object of the invention is to provide an apparatus and method whereby the chemical injector may be positioned in a well bore by means of a wire line through the casing or tubing of the bore and whereby the wire line may be removed and the injector unit may be left at the desired location in a well bore.

Still another object of the invention is to provide an apparatus which shall include improved means for anchoring or holding the chemical injection unit at a desired location in a well tubing.

A further important object of the invention is to provide an apparatus whereby a chemical injecting unit may be readily introduced into a well bore at a desired location therein, and may be securely anchored by means of an anchor in the tubing, or may be secured to the tubing, or may be fastened in a collar recess of a tubing.

Yet another object of the invention is to provide an apparatus which may be automatically operable for injecting successive charges of the chemical treating agent into a well bore and which shall be readily operable merely by shutting in an opening in a flowing well.

A still further important object of the invention is to provide an apparatus and method whereby a plurality of charges of a chemical in concentrated form may be sequentially introduced into a well bore, and whereby each injection may be readily controlled as to time.

A still further important object of the invention is to provide an apparatus and method in accordance with the preceding objects wherein the actuation of the device for ejecting successive charges of the chemical treating agent into a well bore may be readily controlled from the surface in an improved manner without the necessity for any mechanical connections therewith.

Still another object of the invention is to provide an apparatus wherein the chemical injection unit, after the same has been exhausted of its contents, may be automatically removed from the well bore without the necessity for a wire line tool or the like.

And a final important object of the invention to be specifically enumerated herein resides in the provision of an apparatus which may be readily constructed of a plurality of units, which may be attached together in any desired number in order to make up an injector unit having any desired number of charges of chemical treating agent to be successively ejected into a well bore.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a view in vertical central section through a well bore or tubing showing in elevation a preferred embodiment of apparatus positioned in a well casing or string of tubing;

Figures 2 and 2A are, respectively, views in vertical section taken substantially upon the planes indicated by the section lines 2—2 of Figure 1 and showing the upper and lower portions, respectively, of the injector unit of this invention;

Figures 3–5 are successive detail views in vertical central section through one of the units of the injection apparatus and illustrating the manner in which the actuator piston of the unit is operable to release the charge of chemicals contained in one unit of the apparatus;

Figures 6 and 7 are successive detail views in vertical section illustrating the manner in which the actuator piston is utilized to effect removal of the receptacle from the casing or tubing string after the injector unit has been exhausted of its contents;

Figure 8 is a vertical sectional view through the actuator piston by which the charges of chemical treating agent are successively released by manipulating the fluid pressure of the flowing well;

Figure 9 is a horizontal sectional view taken substantially upon the plane indicated by the section line 9—9 of Figure 8;

Figures 10 and 11 are horizontal sectional detail views through the injector apparatus receptacle;

Figure 12 is a vertical sectional detail view taken substantially upon the plane indicated by the section line 12—12 of Figure 11;

Figure 13 is a fragmentary view in vertical section, similar to Figure 2, of a modified valve construction adapted to be actuated by the actuator piston for releasing successive charges of the chemical treating agent from the device; and, Figure 14 is a detail view in vertical section illustrating the manner in which the receptacle of the injector apparatus may be assembled in longitudinal alignment to form a device having any desired number of charges of chemical treating agent.

The invention disclosed and claimed herein is similar in subject matter to that set forth and claimed in my copending application, Serial No. 602,621 filed August 7, 1956, for Fluid Pressure Operated Chemical Feeder and Method.

In the treating of the tubing or casing of wells such as oil wells for corrosion or scale, the operator can realize a much greater efficiency in the expenditure of money and chemicals as well as in more productive results if the chemical treating agents can be placed in the hole at the desired location, in concentrated form or in diluted form. Further, the application of chemical agents for other purposes in connection with producing, restoring or increasing the production of an oil well or other well will be rendered more effective when the treating agent in any desired concentration is released directly at the region which it is desired to treat. It is the primary purpose of this invention to effect this important desideratum.

Disclosed in Figures 1–12 and 14 is a preferred form of apparatus for practicing the method and principles of this invention. In this embodiment there is shown a well bore 10 extending into a formation which is provided with a casing 12. Indicated generally by the numeral 14 is a preferred form of apparatus by which chemical treating agents in any selected concentration can be automatically discharged, in independently timed sequential ejections, at a desired location in a well bore, and under the control of an automatic fluid flow actuated means.

Referring first to Figures 2 and 2A, it will be observed that the apparatus 14 consists of an elongated body member or generally cylindrical container or casing 16 constituting a receptacle and which is provided with a headpiece 18 together with a bottom member 20.

The head member 18 consists of a body having a depending skirt or sleeve 22 which encircles the upper end of the casing 16 of the receptacle and is secured thereto in any desired manner. At its upper portion, the head member 18 is provided with a diametrically reduced upwardly projecting neck 24 having a diametrically enlarged head 26 at its upper extremity. The neck and head provide means whereby the device may be secured to a wire line and then lowered into a well bore either into the casing 12, or through a tubing string if desired, to a desired location.

The bottom member 20 consists of a central sleeve having an upwardly projecting skirt or rim 28 which is adapted to embrace and be secured to the lower end of the casing 16, the bottom member terminating at its lower end in a plurality of resilient hooked fingers 30 which are adapted to resiliently and yieldingly embrace the upper diametrically enlarged headed portion 32 of an anchor member 34. The latter may conveniently consist of a tubular element forming an anchor stop and may be suitably positioned and carried by a portion of the casing 12 or of a section of tubing or the like. In any event, the member 34 constitutes a fixed support to which the lower end of the injection device 14 may be releasably secured by lowering the device in a well bore until the fingers 30 resiliently engage the headed portion 32 thereof. The fingers 30 each having an inwardly projecting rib 31 with upwardly and downwardly directed conical flaring surfaces 33 and 35. As the device is lowered, the surfaces 35 will engage the anchor stop head 32, and under the weight of the device will expand the fingers until the ribs 31 drop below 32.

An axial or longitudinal, central flow passage continuously open at its upper and lower ends, extends through the device, and may conveniently comprise a tube 36 which is externally threaded at its upper end as at 38 for reception in the internally threaded bore 40 which extends through the member 18. Surrounding the upper end of the tube 36 is a washer or plate 48, and the plate 48 and the cylindrical body 46, screw threaded upon the lower end of the tube 36 and secured in the lower end of the member 15 and in the skirt 28 of the bottom member 20, serve as the end closure members of the member 16 whereby the latter constitutes an annular chamber surrounding the tube 36 and compartmented as set forth hereinafter for the reception of the chemical treating agent to be dispensed by the device.

Disposed in the bottom member 20 and secured thereto and extending therebeneath and below the body 46 is a cylindrical element 50 having therein a tapered downwardly opening and downwardly outwardly flaring bore 52. The upper end of this bore is provided with a diametrically reduced port 54 which is of smaller diameter than that of the interior of the tube 36 and has an upwardly flaring upper surface or seat 55 and an annular lower surface 57 comprising a shoulder, as seen in Figures 2A, 6 and 7, for a purpose to be subsequently set forth.

Disposed at longitudinally spaced intervals along the length of the tube 35 are a plurality of washers or partitions 56 which are welded or otherwise rigidly secured to the tube and the casing 15 to, thus provide between the casing and the central tube 36 a plurality of longitudinally spaced annular chambers or compartments.

In some instances, it may be preferred to provide a single tube 35, and a single casing 16 with a plurality of partitions being secured and disposed therebetween. In other instances, it may be preferred, as shown in Figure 14, to provide the tube 36 in the form of a plurality of separate sections 36a and 36b, with one of the partition members 56 being welded to one end of one of the sections as at 36a, and with the lower end of the other section 36b being adapted to be disposed in the section 36 and welded thereto, as will be apparent from Figure 14.

Opening into the compartments on opposite sides of each partition 56 are a plurality of port means or discharge ports 60 which are formed in the central tube 36 and which constitute a discharge means whereby the contents of each compartment may be permitted to escape into or be exposed to the interior of the tube 36. Closing each of these discharge ports is a valve member or closure consisting of a plate 62 having slidably journaled therein and extending therethrough is a releasable fastener having a retaining hook 64 which is biased by a spring 66. The arrangement is such that when the plate 62 is disposed over the discharge port 60, the hook 64 will engage the lower lip of the discharge port to thereby releasably retain the closure plate in position. Thus, the contents of each compartment are retained therein until selectively released by a means and in a manner to be subsequently set forth.

Referring again to Figure 2, it will be seen that the upper end of central bore 40 is provided with an annular ring 68 of rubber or other suitable material which constitutes a shoulder means or a valve seat, this annulus or ring being retained in place as by an externally threaded sleeve 70. Opening into the central bore 40 of the upper member 18 from the exterior of the neck 24 are by-pass means consisting of ports 72 which thus establish communication between the interior and exterior of the device.

Reference is now made more particularly to Figures 8 and 9 for an understanding of a piston actuator for selectively releasing the valve member 62. The same includes a cylindrical body or sleeve 80 which has its closed upper end embedded in a piston 82, being retained therein as by a transversely disposed pin 84, and which piston member has a hemispherical upper surface 86 adapted to cooperate with the seat 68. The lower portion of the sleeve 80 is provided with a yieldable catch for engaging the hooks 64, including a diametrically enlarged head portion 88 having its exterior surface of a conical, tapering downwardly narrowing shape as at 90. The upper surface of the enlarged portion 88 is provided with an upstanding peripheral ridge 92. The cylindrical body 80 is provided with a plurality of longitudinally extending slots 94 therein providing circumferentially spaced resilient elements whereby resiliency is imparted to the body to thereby permit radial expansion and compression of the enlarged portion 88.

As so far described, the arrangement is such that the piston member 82 is slidable in the bore 40 of the member 18 and through the central tube 35, and has a sufficient fluid-tight engagement therewith whereby the pressure of flowing fluids in a well bore will move the piston member to its upwardly position as shown in Figure 2. However, the weight of the piston actuator is such that upon cessation of the pressure of flowing fluids, below a predetermined value, the actuator will drop by its own weight downwardly through the central passage in the device in a manner to be subsequently set forth.

The resiliency of the enlarged portion 88 is such that the same will radially compress during downward travel of the body whereby the same will pass beneath the hook 64 of the valve members, but the headed portion 82 will not pass the same. Further, when the piston actuator drops to the lower end of the tube 36 in a manner to be subsequently described, the resilient enlarged portion 88 will pass beneath the reduced bore 54 in the member 50, as shown in Figures 6 and 7 for a purpose to be subsequently apparent.

In some instances it is preferred to provide an axially extending bore 96 in the body 18 which communicates at its upper end with one of the ports 72 and its lower end opens into an annular chamber 98 communicating with a port 100 in the member 48. Additionally, if desired, each of the partitions 56 is provided with a port 102 therethrough having a suitable upwardly opening and downwardly closing check valve thereof. As shown in Figure 2A, the central tube 36 adjacent its lower end and above the body 46 is provided with a laterally projecting sleeve 104 which constitutes a retainer for a ball valve 106 and a compression spring 108. This ball valve is yieldingly urged by its compression spring against the pressure inlet port 110 extending through the wall of the casing 16 to provide a non-return valved inlet.

The operation of the apparatus is as follows. With the compartments between the central tube 36 and the casing 16 filled with charges of a chemical treating agent, of any desired nature, and gaseous, liquid or solid, as desired, and with the piston actuator disposed in the upper end of the bore 40 as shown in Figure 2, the device is ready for operation and is lowered into a well casing by means of a wire line attached to the neck portion 24 thereof. The apparatus is lowered until the fingers 30 on the lower end thereof resiliently engage the headed portion 32 of an anchor member 34 previously provided and placed in the casing or well bore. With the fingers so attached, the device is now securely held in position, and the wire line may be removed, thereby leaving the apparatus in a selected location in a well bore.

It will be observed that during this operation the flow of the well has been unhindered, the flowing fluids passing upwardly through the bore 52, and through the central tube 36, and through the bore 40, holding by the velocity of pressure of their flow the piston actuator in its raised position, and escaping through the port 72 into the interior of the casing 12. As long as this flow continues, the piston actuator will obviously be held in its raised position whereby the flow of the well will be uninterrupted.

During this time, pressure existing within the casing 12, may enter by the ball check valve controlled port 110 and through the communicating apertures 102 in the partitions, will serve to pressurize each of the compartments, at the pressure prevailing upon the exterior of the device.

This is a condition prevailing when the device is installed in a well at the desired position therein and is ready for operation.

When it is desired to inject the chemical agent into the flowing well bore, the operator merely shuts in or throttles the flow of the well by the usual well flow control at the surface, not shown. This stopping or reducing of the velocity of flow and its consequent pressure permits the piston actuator to drop by gravity downwardly below the discharge port 72, until as shown in Figure 3, the resilient hooked lower end 88 of the actuator is radially compressed and drops below the uppermost of the valve hooks 64. Further downward movement of the piston is stopped since the non-yieldable body portion 82 thereof cannot pass below the inwardly projecting hook 64.

Thereafter, the flow of the well is permitted to resume, and the increase in the velocity of flow and its pressure then causes the piston actuator to move upwardly until its resilient fingers hook beneath and engage the valve hook 64, as shown in Figure 4. Upward movement of the piston as shown in Figure 5 then lifts the valve plate and its hook upwardly, until the curved cam portion 65 of the hook striking the upper edge of the discharge port 60 exerts a camming action and causes the hook to be forced inwardly of the annular chamber and then with the plate 64 is dropped to the bottom thereof against the partition plate 56, thereby completely uncovering the port and disengaging from the piston actuator rim 92. This is the position shown in Figure 5, and thereafter the piston actuator moves upwardly to the position shown in Figure 2. Thereupon the contents of the chamber thus opened will be inspirated by the velocity of flow through the central tube 36 and will be discharged from the port 72 thereof to thereby treat the interior of the casing or tubing in which the device is located with the desired chemical treating agent.

When it is desired to again inject a charge of the chemical treating agent into the well bore, the operation is repeated, and the actuating piston dropping down then hooks its rim 92 beneath the next lower valve hook 64. Thereupon the operation is repeated. It will thus be apparent that as desired, the device may be automatically actuated to successively discharge the contents of successive compartments into the well bore for treating the same.

After the last compartment has been emptied, the piston for the next operation, see Figures 6 and 7, may be caused to drop beneath the portion 54 of the passage. The beveled surface 55 will radially compress the resilient hooks of the piston for passage therebeneath and will then engage beneath the surface 57. Thereupon, upon the next restoration of flow of the well, the pressure will cause the piston to lift upwardly, and as shown in Figure 7, to pull the resilient fingers 30, by means of the tapering conical surfaces 33, away from the anchoring head 32 of the anchor member 34, whereupon the entire apparatus will be forced upwardly through the casing or tubing and can be withdrawn from the upper end thereof.

It will thus be seen that the actuator piston serves as a means which is responsive to the controlled flow of a well for releasing successive charges of a chemical treating agent as desired; and finally, as a means for removing to the surface the device itself after all of its charge has been exhausted.

A somewhat modified construction of the valve member is, of course, possible. One such arrangement is shown in Figure 13 wherein the central tube 36 in the casing 16 of the device has its discharge ports provided with a valve member in the form of a rubber plug or bushing 63 which is yieldingly fitted into the discharge opening, and is provided with a hook or latch 67 which is embedded in the material of the valve. The hook 67 is provided with a camming portion 69 corresponding to the portion 65 of the hook 64. The operation of the device, however, is the same as that in the preceding embodiment.

As hereinbefore described, the device is lowered by a wire line through a casing or tubing to its designated location. However in some instances, the dispensing device may form a part of a flow tubing, constituting a section of the same as the tubing is lowered into the well.

In some instances, it may be preferred to omit entirely the valved passages 102, the passages 96, 100 and the valve assembly 104, 106, 108 and 110.

Further, the anchor member 34 instead of being a tubing anchor or similar anchoring device, might constitute any other desired type of fastener.

It will be observed that the method of operation as hereinbefore set forth enables the operator of a flowing well to maintain the same in effective operation by periodically, and at any desired time, to cause the discharge of a charge of a chemical treating agent into the flowing well, by merely manipulating the flow of the well at the surface thereof. This method and apparatus therefore enables the well to be chemically treated in various ways, as for example, to remove scale and rust therefrom, by merely controlling the velocity of flow of the well and without the necessity for long periods of idleness of the well in order to introduce the chemical treating agent and then restore the well to normal operation. Further, this method and apparatus provides a means whereby the chemical treating agent at any desired concentration, may be, without previous dilution, directly introduced to a desired location of the well for treating the same.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. An apparatus for releasing a chemical treating agent into a well bore comprising an elongated body member constituting a receptacle and of such size as to be capable of introduction into a well bore, said receptacle having a longitudinal passage therethrough open to upward flow of well fluid, a piston actuator slidable in said passage and gravity urged to the bottom of said passage, shoulder means in said passage at the upper end thereof initially retaining said actuator in the top of said passage against movement outwardly from said passage whereby said actuator may be urged against said shoulder means by flow of well fluid through said passage, means in said body effecting the by-pass of well fluid from said passage past said actuator and to the exterior of said receptacle and into the well bore above said body when said actuator is positioned at the upper end of said passage, said receptacle having means therein including partitions defining a plurality of compartments spaced longitudinally of said passage for retaining within each compartment a separate charge of a well treating agent, port means establishing communication between each compartment and said passage, a closure for each port means, a releasable fastener for each closure including a hook extending into said passage into the path of travel of said actuator, a yieldable catch on the lower end of said actuator positioned for engagement with said hook upon upward travel of said actuator past said hook for releasing said fastener and opening said closure and yieldable for passing said hook upon the downward travel of said actuator past said hook.

2. The combination of claim 1 including a stop means mounted upon said body at the lower end of said passage for preventing movement of said actuator from the passage lower end.

3. The combination of claim 2 wherein said stop means comprises an upwardly facing seat and a downwardly facing shoulder and extends into said passage a sufficient distance to engage said actuator thereabove and prevent movement of the latter past said downwardly facing shoulder and said fastener is being retained by said shoulder against relative upward movement whereby said actuator will be effective to withdraw said apparatus from a well bore.

4. The combination of claim 1 including a non-return valved inlet into the interior of the receptacle from the exterior of said body, said inlet establishing communication from the exterior of said body to the interior of at least one of said compartments whereby to admit the pressure of the flowing well fluid into the latter.

5. The combination of claim 1 wherein said catch comprises a plurality of radially resilient elements secured to and depending beneath the lower end of said actuator and being resiliently biased into a radially expanded condition for engagement with said hooks.

6. The combination of claim 1 wherein said catch comprises a sleeve secured to said actuator and depending beneath the lower end of the latter, said sleeve being longitudinally slotted at its lower end to provide thereby a plurality of circumferentially disposed radially resilient elements, said elements being resiliently biased into a radially expanded condition for engagement with said hooks.

7. An apparatus for releasing a chemical treating agent into a well bore comprising an elongated body member constituting a receptacle and of such size as to be capable of introduction into a well bore, said receptacle having a longitudinal passage therethrough open to upward flow of well fluid, a piston actuator slidable in said passage and gravity urged to the bottom of said passage, shoulder means in said passage at the upper end thereof initially retaining said actuator in the top of said passage against movement outwardly from said passage whereby said actuator may be urged against said shoulder means by flow of well fluid through said passage, means in said body effecting the bypass of well fluid from said passage past said actuator and to the exterior of said receptacle and into the well bore above said body when said actuator is positioned at the upper end of said passage, said receptacle having means therein defining a compartment for storage therein of a well treating chemical agent, port means establishing communication between said compartment and said passage, a closure for said port means, a releasable fastener for said closure including a hook extending into said passage into the path of travel of said actuator, a yieldable catch on the lower end of said actuator positioned for engagement with said hook upon upward travel of said actuator past said hook for releasing said fastener and opening said closure and yieldable for passing said hook upon the downward travel of said actuator past said hook.

8. The combination of claim 7 including a stop member in said body adjacent the lower end of said passage and below the lowermost hook and including an upwardly facing seat and a downwardly facing shoulder and positioned for engagement by said catch whereby to retain said actuator in the lower portion of said passage thereby substantially blocking flow of well fluid through the latter to thereby cause upward travel of the body in the well bore by the flow of well fluid in the latter.

9. The combination of claim 7 wherein said catch comprises a plurality of radially resilient elements secured to and depending beneath the lower end of said actuator and being resiliently biased into a radially expanded condition for engagement with said hooks.

10. The combination of claim 8 wherein said catch comprises a sleeve secured to said actuator and depending beneath the lower end of the latter, said sleeve being longitudinally slotted at its lower end to provide thereby a plurality of circumferentially disposed radially resilient elements, said elements being resiliently biased into a radially expanded condition for engagement with said hooks.

References Cited in the file of this patent

UNITED STATES PATENTS

| | | |
|---|---|---|
| 2,619,180 | Smith et al. | Nov. 25, 1952 |
| 2,657,753 | Carpenter | Nov. 3, 1953 |